July 8, 1969     G. W. STEWART     3,454,741

HEAT SEAL MACHINE

Filed April 11, 1966

INVENTOR.
GEORGE W. STEWART
BY
Bair, Freeman & Molinare
ATTORNEYS

United States Patent Office 3,454,741
Patented July 8, 1969

3,454,741
HEAT SEAL MACHINE
George W. Stewart, Waco, Tex., assignor to Kwikseal, Waco, Tex., a copartnership
Filed Apr. 11, 1966, Ser. No. 541,601
Int. Cl. H05b 1/00, 3/02
U.S. Cl. 219—243                         1 Claim

ABSTRACT OF THE DISCLOSURE

A device for heat sealing two materials together. A frame is provided and includes a plurality of work stations which are fixed to the frame. An upright support column extends from the frame and a housing is pivotally mounted to the column. A vertically adjustable working head is mounted on said housing. The heated working head may be selectively positioned over one of the plurality of work stations upon pivoting of said housing. An air cylinder and piston is mounted in the housing in an upright position to raise and lower the workhead between the raised and lowered positions for performing the heat sealing of the materials. A solenoid valve is mounted in the housing and directs air to the air cylinder for the raising and lowering of the heated working head. A switch is mounted in the housing for activating the solenoid valve to drive the working head down and timer means are provided for opening the switch and causing the air cylinder to drive the working head upwardly after completion of the heat sealing operation.

---

This invention relates to a heat sealing machine for use in securing heat sensitive tape, patches, labels or the like to other objects. In particular, the invention relates to a novel heat seal machine which provides safety features new in the art and which provides a controlled force system for use in conjunction with double buck work stations whereby heat sealing is done more efficiently than in prior art machines.

Heat sealing machines generally known in the art all suffer from several disadvantages. Heretofore, no machine has provided a force system which is easily controlled and adjusted and which provides for accurate pressure control during the heat and pressure sealing operation. In addition, no prior art machines provide simple and reliable safety features to prevent an operator from being burned or which provide means for quickly raising the hot head of the machine in the event an operator chooses to do so. The machine of my invention on the other hand provides a sealing device by which controlled pressure can be applied in the sealing operation and which contains safety features heretofore unqnown in the art.

It is therefore an object of this invention to provide a novel heat sealing machine in which the back-up pressure for sealing can be controlled accurately and simply.

It is a further object of this invention to provide a heat seal machine which incorporates safety features to prevent an operator from being injured by burning and further to enable an operator to quickly turn off the machine and discontinue sealing in the event the operator so chooses.

It is yet another object of my invention to provide a heat seal machine having controlled pressure characteristics and novel safety features and in addition a double work station structure to render the sealing process efficient and rapid.

Other objects of the invention will become clear as it is more fully described hereinafter.

Figure 1:
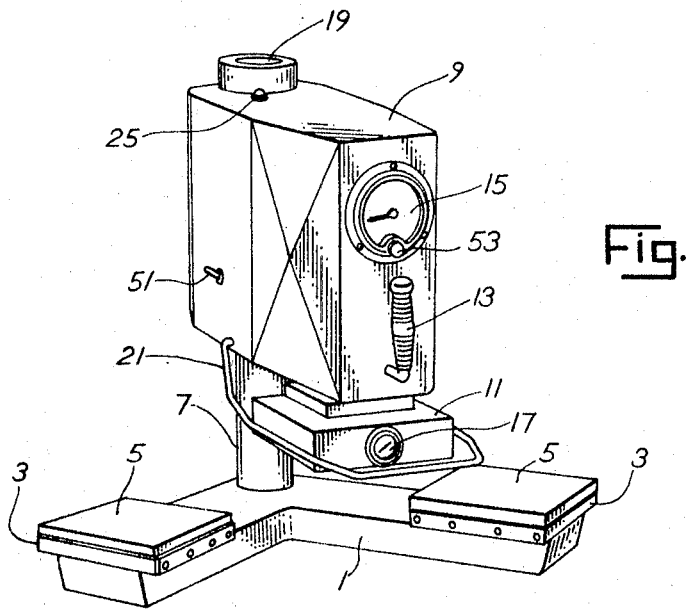
FIG. 1 is a perspective view showing the heat seal machine of the invention.

Referring to FIG. 1, the machine of my invention comprises base 1 having arms extending at about a 90° angle to one another. At the end of each arm are work bucks 3 which are secured to base 1 by any suitable means. The work bucks are covered with a protective cover, for example heavy duty silicon-treated textile covers 5.

Although the embodiment of my invention shown in FIG. 1 has two work bucks 3, it is within the scope of my invention to have but a single work buck or more than two work bucks.

Mounted at the rear of base 1 is a support column 7 which carries a control box, shown generally at 9. Control box 9 houses the various control elements described hereinafter and supports hot head 11 which is movable up and down between the upper position shown in FIG. 1 and a lower position in which head 11 is lowered from vertically above one of bucks 3 and contacts such buck. Control box 9 is rotatably secured to post 7 so that it can be rotated horizontally by means of handle 13 between an extreme left and extreme right position to move head 11 over the respective bucks. On the face of control box 9 is a timer dial indicator 15 and on the forward vertical face of hot head 11 is temperature indicator 17. Atop control box 9 is an air pressure indicator 19.

Figure 2:
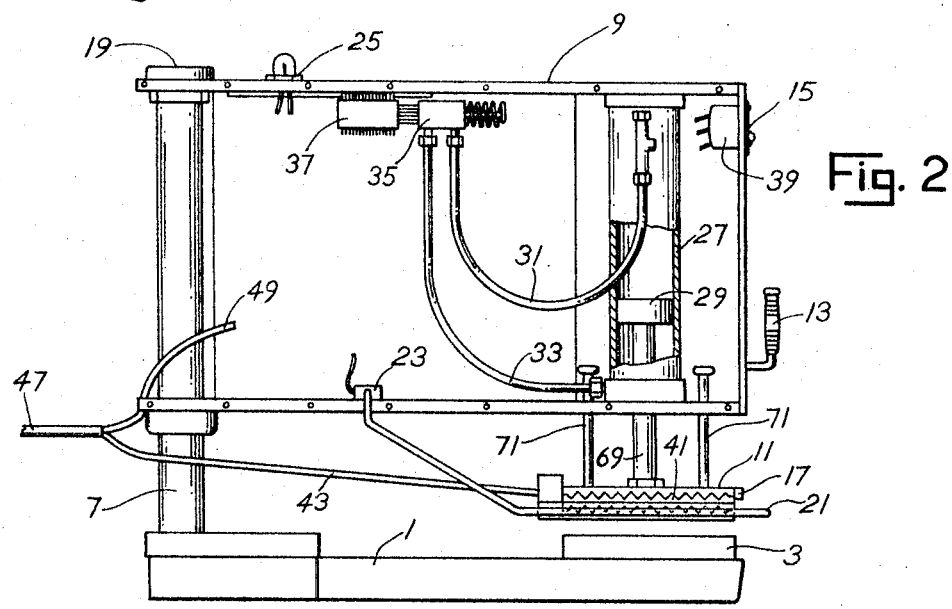
FIG. 2 is a side view of the control section of the heat sealing machine.

Secured to control box 9 and enclosing hot head 11 is safety control bar 21 which is connected to micro switch 23 as shown in FIG. 2 such that any contact with bar 21 causes switch 23 to close. Also secured to control box 9 is pilot light 25 which indicates whether power is on or off in the box.

Referring to FIG. 2, control box 9 houses a pneumatic cylinder 27 in which a piston 29 travels vertically in response to air pressure admitted to the top or bottom of cylinder 27 through lines 31 or 33. Piston 29 is connected to head 11 by rod 69 and movement of piston 29 causes corresponding movement of hot head 11. Pins 71 act as guide pins to prevent rotation of head 11.

Pneumatic lines 31 and 33 are connected to an air valve 35 which is controlled by means of spring-biased solenoid 37 as hereinafter described. Control box 9 also houses a timer motor 39 which may be any conventional timer which closes a switch and actuates a circuit for a controlled period of time, then opens the switch and breaks the circuit.

Figure 3:
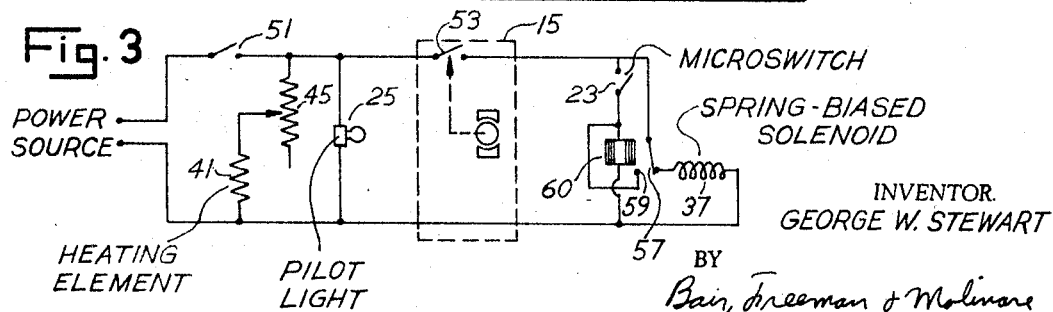
FIG. 3 is a circuit diagram showing the operating features of the heat seal machine.

Hot head 11 encloses a resistance heating element 41, well known in the art. The heating element is powered through lines 43 which are connected to a source of electrical energy through line 47. The temperature of hot head 11 is controlled by means of a variable resistor 45 (FIG. 3). A branch of power line 47 is shown at 49 in FIG. 2 and serves to power the timer and solenoid as described hereinafter.

Referring to FIG. 3, the device is powered by conventional 110 volt AC power. The unit is actuated by means of a main power switch 51 which when closed provides power to heating element 41 through variable resistor 45 and also provides power to pilot light 25 which indicates that the machine is in an "on" condition.

The timer cycle device, shown generally at 15, comprises a conventional timer motor with a switch means 53 which is closed whenever the motor circuit is actuated. Spring-biased solenoid 37 is normally in the position shown in FIG. 3 at which position switch 57 is closed completing a circuit from power through switches 51, 53 and 57 and solenoid 37 back to the power source. When solenoid 37 is in the position as shown in FIG. 3 and switch 57 is closed, air is admitted to the top of cylinder 27 and piston 29 is urged down so that hot head 11 can contact one of the bucks 3. When the timer cycle is not running, switch 53 is open and the circuit including the solenoid is broken so that solenoid 37 is maintained in its non-actuated position permitting air flow through valve 35 to the bottom of cylinder 27 to raise head 11.

The safety feature of the invention is shown in the circuit of FIG. 3 and comprises micro switch 23 which is part of a relay circuit including relay 60 and contact 59. Under normal operating conditions, micro switch 23 is open, switch 59 is open and switch 57 is closed. In the event micro switch 23 is closed upon inadvertent or intentional striking of bar 21, relay 60 is energized, contact 59 is closed, and the circuit through contact 57 and solenoid 37 is broken. Solenoid 37 then moves under spring bias and shifts valve 35 to permit air flow to the bottom of cylinder 27 through line 33 and urge piston 29 upward. Since the relay circuit is a self-holding circuit through contact 59, head 11 stays up until the end of the timed cycle at which time switch 53 is opened. Upon starting a new timing cycle, switches 57 and 53 are again closed and head 11 is lowered as before.

The air pressure exerted in cylinder 27 on piston 29 is supplied from a source of pressurized air (not shown) and is controlled by means of an air pressure regulator shown diagrammatically at 19 which is conventional in the art and which may be housed within control box 9. The air pressure regulator is adjusted to a desired working pressure. Air flow in lines 31 and 33 is controlled by flow valves (not shown) in the lines to regulate the velocity of up and down movement of head 11.

The amount of force exerted at the point of impact of head 11 and work bucks 3 may also be controlled by adjusting the vertical position of head 11 on rod 69. For this purpose, rod 69 is provided with threads at its lower end (not shown) so that head 11 may be screwed up and down thereon. The extent of downward movement of head 11 is also controlled by posts 71 which have knobs at their upper ends as shown in FIG. 2. In addition, the extent of downward movement of head 11 and the point of peak pressure is controlled by adjustment collars (not shown) attached to column 7, or by raising or lowering control box 9, or by adjustment and leveling screws located in the base plates of work bucks 3.

In operation, the operator of the device first turns on the power by closing switch 51 which actuates pilot light 25 and commences the heating of plate 11. Control box 9 and hot head 11 are then rotated horizontally to a position above one or the other of bucks 3. When a seal is ready to be made between two pieces on the selected buck, timer 15 is actuated by closing switch 53 and solenoid 37 opens valve 35 to permit air flow through line 31 into the top of cylinder 27. This lowers head 11 into contact with the selected buck and the work pieces to be sealed or bonded, and head 11 remains lowered until switch 53 is opened automatically at the end of the timed cycle. When switch 53 opens, the circuit through solenoid 37 is broken and the solenoid returns to the biased position at which air valve 35 permits air to flow into the bottom of cylinder 27 and head 11 is returned to its upper position. The operator may then rotate control box 9 by handle 13 to a position above the other buck 3 and the cycle repeated.

In the event safety bar 21 is struck at any time during the "down" cycle either intentionally or unintentionally, micro switch 23 is closed and relay 60 actuated as above described. Head 11 is then raised and remains raised until timer 15 completes the cycle and is again actuated.

It can be seen from the above description that my invention provides a convenient and safe heat sealing machine wherein the sealing operation may be performed on one work buck while a work piece is being readied on the second buck. Also in the event an operator touches the hot box and thereby strikes safety bar 21, the head is immediately raised and remains raised until a new cycle is actuated. In this way the operator has complete control over the raising and lowering of the hot head at all times and the operator is protected against inadvertent touching of the hot head.

Those skilled in the art will recognize that various modifications can be made to my invention within the scope thereof which I intend to be limited solely by the following claim.

I claim:

1. A device for heat sealing at least two materials together, said device comprising a frame, a plurality of laterally spaced work stations fixedly secured to said frame, an upright support column projecting from said frame, a housing, a vertically adjustable working head mounted on said housing, electrical resistance heating means carried by said working head for heating said working head, means for pivotally securing said housing to said upright support column, said work head being selectively positioned over one of said plurality of work stations upon pivoting of said housing about said column, air cylinder and piston means mounted in said housing, said piston means being secured to said working head for raising and lowering said working head between raised and lowered positions for selectively heat sealing said materials together between said work head and said work station, electrically operated valve means in said housing for directing air to said air cylinder means for the said raising and lowering of said piston means and thereby said heated working head, switch means mounted in said housing for activating said electrically operated valve means to drive said piston means and thereby said working head downwardly, manually operated timer means mounted on said housing for opening the switch means and causing said cylinder to drive said working head upwardly after completion of the heat seal operation, safety switch means on said housing, safety bar means pivotally carried by said housing adjacent said heated working head, said safety bar means surrounding said heated working head when said head is in its lower position, selected pivotal movement of said safety bar means activating said safety switch means when said work head is in the lowered position causing said air cylinder means to drive said piston means and thereby said work head upwardly from one of said work stations, and electrical power means extending to said housing for operating said heating means, said valve means, and said timer means.

References Cited

UNITED STATES PATENTS

| 2,908,320 | 10/1959 | Rohdin | 100—93 X |
| 3,035,510 | 5/1962 | Carpenter et al. | 100—93 |
| 3,244,579 | 4/1966 | Chiesa | 219—243 X |
| 3,272,114 | 9/1966 | Rakel | 100—93 X |

RICHARD M. WOOD, *Primary Examiner.*

C. L. ALBRITTON, *Assistant Examiner.*

U.S. Cl. X.R.

100—93